Oct. 30, 1962 R. A. MUNSE 3,060,988
CAGE NUT HAVING A SPRING METAL MOUNTING PLATE WITH CATCH FINGERS
Filed Jan. 5, 1959 2 Sheets-Sheet 1

INVENTOR.
ROBERT A. MUNSE
BY
Malcolm W. Fraser
ATTORNEY

INVENTOR.
ROBERT A. MUNSE

United States Patent Office 3,060,988
Patented Oct. 30, 1962

3,060,988
CAGE NUT HAVING A SPRING METAL MOUNTING PLATE WITH CATCH FINGERS
Robert A. Munse, Perrysburg, Ohio, assignor to The Bishop and Babcock Corporation, Cleveland, Ohio, a corporation of Ohio
Filed Jan. 5, 1959, Ser. No. 785,028
1 Claim. (Cl. 151—41.75)

This invention relates to fasteners, and more particularly to fastener assemblies and retaining means for attaching a fastener to an apertured support or panel and aims generally to improve and simplify existing retaining means for that purpose.

An object is to produce a holder or retainer for a fastener which is adapted for self locking attachment to an apertured support, thus eliminating the necessity of fastener attaching bolts, rivets, welding and like attaching means.

Another object is to produce a novel and improved holder or retainer for non-rotatably mounting and supporting a fastener to an apertured support.

A further object is to produce a holder or retainer for a fastener, such as a nut, and having means of a unique and improved character for mounting the assembly on an apertured support.

A still further object is to produce a cage nut which includes a sheet metal nut support which can be conveniently mounted on an apertured support and includes a resilient arm member containing a nut element and which after the assembly is mounted on an apertured panel may be snapped to a position of use insuring the attachment of the cage nut to the apertured support in a simple, reliable and efficient manner.

A still further object is to produce a new and improved two part fastener assembly which is simple and economical in construction, may be easily and quickly mounted on an apertured support, and effectively locked or secured thereon for engagement by a cooperating fastener member.

Other objects and advantages of the invention will hereinafter appear and for purposes of illustration but not of limitation, embodiments of the invention are shown on the accompanying drawings in which.

Figure 1:
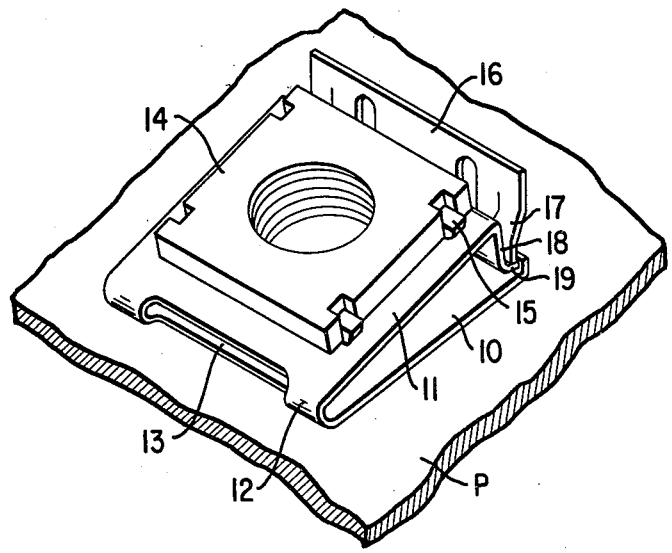
FIGURE 1 is a perspective view of a cage nut mounted on an apertured support or panel, the latter being shown in fragment.
Figures 2, 3, 4:
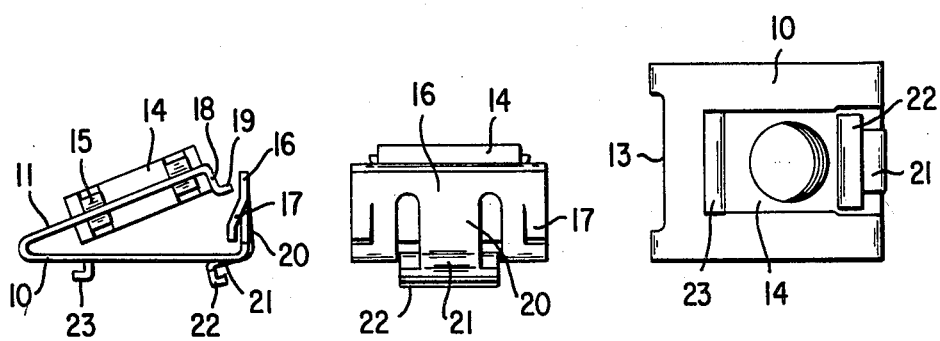
FIGURE 2 is an end elevation of the cage nut assembly shown in FIGURE 1.
FIGURE 3 is a bottom plan view of the cage nut shown in FIGURE 1.
FIGURE 4 is a side or edge elevation of the cage nut shown in FIGURE 1, the members of the mounting plate being shown in disengaged position.

The illustrated embodiment of the invention comprises a cage nut assembly having a spring metal mounting plate provided with a flat lower panel member 10 having a centrally apertured portion, as indicated on FIGURE 3, and an integral flat upper panel member 11 which is joined to the lower panel member 10 by an integral bend 12, from which is struck material providing a slot or cut out 13. This enables the upper plate member 11 to be flexed more readily toward and from the lower plate member 10.

A rectangular aperture is formed in the upper plate or panel member 11 and disposed therein is a rectangular metal nut having a central screw threaded bore. As shown the nut is disposed centrally within the aperture so that half lies above the plate member and half lies below. The nut is retained in place by a plurality of struck-out retaining flanges 15 on opposite sides of the nut. Thus the nut is staked in position in the upper plate member 11.

Formed on the free end of the lower plate or panel member 10 is an upstanding end wall or flange 16 arranged at approximately right angles to the plate member 10. At opposite ends of the flange 16 are struck out integral downwardly extending spring fingers 17, the lower ends of which terminate close to the upper face of the lower plate member 10. It will be observed that each of the fingers 17 incline inwardly from the flange 16 and thence downwardly for latching purposes as will hereinafter appear.

Figure 5:
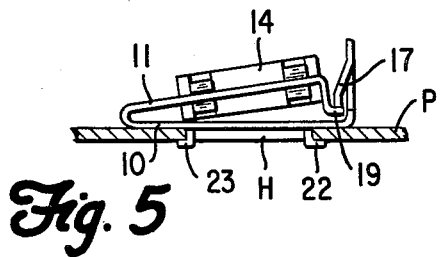
FIGURE 5 is a view similar to FIGURE 4 but showing the fastener mounted on an apertured support and showing the members of the mounting plate in latched engagement.

On the free end of the upwardly inclined upper plate or panel member 11 is a downwardly bent integral wall or flange 18 which as shown abuts the lower adjacent face of the nut 14. The flange 18 terminates in an outwardly bent lip 19, which, when the upper plate member 11 is flexed downwardly forces the spring fingers 17 inwardly until the same are cleared whereupon the fingers snap inwardly over the lip 19 to retain the upper plate member in its downwardly flexed position, as indicated on FIGURE 5.

Integral with the upstanding wall or flange 16 and formed by a pair of parallel cut outs in a downwardly extending arm 20 which has an inwardly extending portion 21 disposed at substantially right angles to the arm 20. The finger 21 terminates in an outwardly extending hook 22. Normally the arm 20, portion 21 and hook 22 are disposed in the position shown in FIGURE 4 in which the arm 20 is inclined outwardly slightly away from the end wall or flange 16. It will be understood that the central portion of the lower plate member 10 is formed with an aperture so that the threaded bore of the nut 14 is accessible through the under side of the fastener. At one end of the aperture and opposite to the hook 22 is an integral hook 23 which depends from the plate member 10 and extends in a direction opposite to the hook 22.

In use the hook 22 is first engaged in the rectangular hole H of the supporting panel P. Then by a lateral movement of the hook 22, the hook 23 is inserted into the panel aperture H and engaged with an edge thereof. The resilience of the arm 20 causes the proper engagement between the hooks 22, 23 and the edges of the panel aperture. In this position a bolt may be inserted through the hole H and into threaded engagement with the nut 14 and by tightening the same the nut may be forced flatly against the lower plate member 10 as will be readily understood. The structure is advantageous in enabling the assembly to be readily mounted in the panel aperture with the upper plate member 11 in its unlatched position and after it has been mounted in the panel aperture H then the nut carrying member 11 may be flexed downwardly into latched position as above described. Instead of a separate nut 14, a nut impression may be formed in the upper plate or panel member 11.

Figure 6:
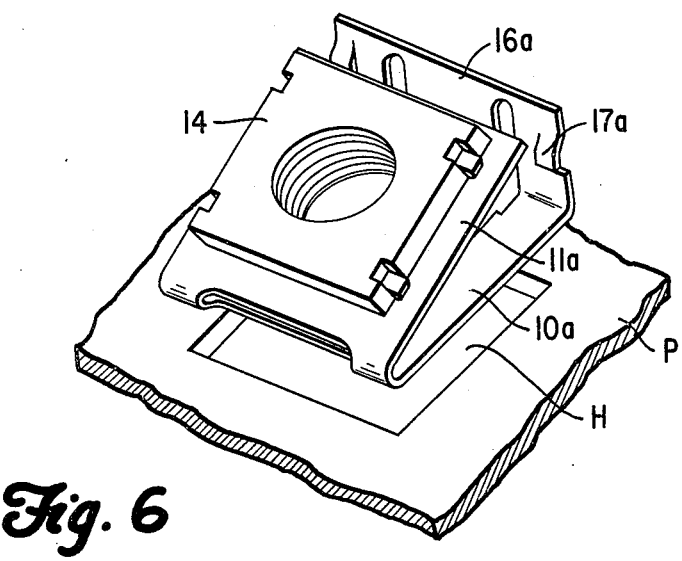
FIGURE 6 is is a perspective view of an alternate form of a cage nut showing the same about to be mounted of an apertured-support.

The alternate form shown on FIGURE 6 is similar to that above described except that the upper mounting plate member 11a is cut off square at the free end, the downturned wall 18 above described being eliminated. In this instance the upwardly extending wall 16a on the lower mounting plate member 10a is provided with relatively short spring finger 17a, which otherwise are similar to the fingers 17 above described. They extend inwardly and downwardly a short distance from the upper edge of the flange or end wall 16a. These spring fingers 17a are adapted to overlie the free edge portion of the upper plate member 11a when the latter is flexed downwardly. Otherwise this fastener is as above described.

Figure 7:
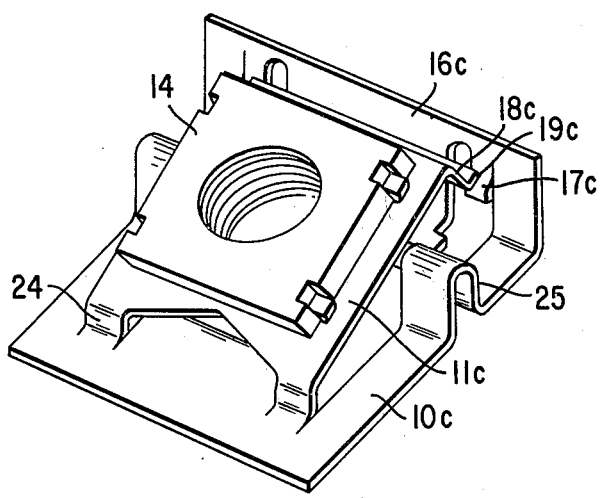
FIGURE 7 is a perspective view of another alternate form of cage nut.

Another alternate form of the invention is shown on FIGURE 7 in which the upper mounting plate or panel member 11c is struck from the body of the lower plate member 10c and is connected thereto by integral hinge members 24. A nut 14 as above described is staked in a hole formed in the upper plate member 11c. Formed on the lower plate member 10c at opposite sides are strengthening upstanding loops 25 which also serve to guide the flexing movement of the upper plate member 11c. As above described the plate member 10c is formed with an upstanding wall or flange 16c from which are struck a pair of relatively short spring fingers 17c to engage the lip 19c extending outwardly from the downturned flange 18c of the upper mounting plate 11c. This fastener is otherwise as described in connection with the form shown on FIGURES 1 to 5.

Numerous changes in details of construction, arrangement and choice of materials may be made without departing from the spirit of the invention, especially as defined in the appended claim.

What I claim is:

A fastener comprising a spring metal mounting plate having a flat base member and an upper plate member integrally joined along one end to the respective end of said base member and forming an acute angle with said base member for resilient flexing movement toward and away from said base member, nut means in said upper plate member, an upstanding flange on the free end of said base member, resilient snap catch means on said flange directed toward the juncture of said base member and said upper plate member, a lip on said upper member engageable beneath said catch means when said upper member is flexed toward said base member, and a pair of oppositely directed hooks on said base member for engaging in a panel aperture, one hook being rigid, an L-shaped spring arm struck from said upstanding flange, and a hook constituting the other of said pair of hooks on the terminal end of said spring arm directed opposite to said rigid arm and for flexure toward and away from same when said catch means and said lip are in their unengaged position and is rendered relatively rigid when said catch means and said lip are engaged with one another.

References Cited in the file of this patent

UNITED STATES PATENTS

| | | |
|---|---|---|
| 2,115,312 | Lombard | Apr. 26, 1938 |
| 2,244,976 | Tinnerman | June 10, 1941 |
| 2,330,372 | Mittendorf | Sept. 28, 1943 |
| 2,552,499 | Tinnerman | May 8, 1951 |
| 2,605,806 | Tinnerman | Aug. 5, 1952 |
| 2,678,075 | Murphy | May 11, 1954 |
| 2,684,703 | Crowther | July 27, 1954 |
| 2,684,704 | Crowther | July 27, 1954 |
| 2,716,434 | Crowther | Aug. 30, 1955 |
| 2,937,682 | Patten | May 24, 1960 |